United States Patent
Mannava

(10) Patent No.: US 12,252,195 B2
(45) Date of Patent: Mar. 18, 2025

(54) EFFORT SHAPING FOR VERSATILE STEERING FEEL

(71) Applicant: STEERING SOLUTIONS IP HOLDING CORPORATION, Saginaw, MI (US)

(72) Inventor: Anusha Mannava, New York, NY (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 670 days.

(21) Appl. No.: 17/149,930

(22) Filed: Jan. 15, 2021

(65) Prior Publication Data

US 2021/0221430 A1 Jul. 22, 2021

Related U.S. Application Data

(60) Provisional application No. 62/962,526, filed on Jan. 17, 2020.

(51) Int. Cl.
*B62D 6/00* (2006.01)
*B62D 5/04* (2006.01)

(52) U.S. Cl.
CPC ........... *B62D 6/008* (2013.01); *B62D 5/0463* (2013.01)

(58) Field of Classification Search
CPC .... B62D 6/008; B62D 5/0463; B62D 5/0472; B62D 6/00
See application file for complete search history.

(56) References Cited

U.S. PATENT DOCUMENTS

| | | | |
|---|---|---|---|
| 2002/0107621 A1* | 8/2002 | Byers | B62D 6/008 180/443 |
| 2016/0280251 A1* | 9/2016 | George | B62D 6/006 |
| 2017/0066473 A1* | 3/2017 | Yu | B62D 6/10 |
| 2017/0183031 A1* | 6/2017 | Ko | B62D 6/008 |
| 2019/0355187 A1* | 11/2019 | Frankovics | B62D 5/0481 |
| 2020/0062297 A1* | 2/2020 | Tsuchimoto | H02P 6/182 |

FOREIGN PATENT DOCUMENTS

| | | |
|---|---|---|
| CN | 1721250 A | 1/2006 |
| CN | 102123903 A | 7/2011 |
| CN | 106926895 A | 7/2017 |
| DE | 102008042666 A1 | 5/2010 |
| DE | 102017112952 A1 | 12/2017 |
| JP | 2015058736 A | 3/2015 |

OTHER PUBLICATIONS

Chinese Office Action and Search Report from the Chinese Patent Office for related Chinese Patent Application No. 202110062529.6 dated Oct. 10, 2022, 6 page(s).

* cited by examiner

*Primary Examiner* — Aniss Chad
*Assistant Examiner* — Chase L Cooley
(74) *Attorney, Agent, or Firm* — Dickinson Wright PLLC

(57) ABSTRACT

A method includes receiving rack force estimate data and receiving vehicle speed data that indicates a speed of a vehicle. The method also includes classifying the rack force estimate data into corresponding rack force estimate segments associated with frequency ranges and estimating, based on at least one rack force estimate segment and the vehicle speed data, a rack force value. The method also includes controlling vehicle steering based on at least the rack force value.

16 Claims, 5 Drawing Sheets

EFFORT SHAPING FOR VERSATILE STEERING FEEL

CROSS-REFERENCES TO RELATED APPLICATIONS

This patent application claims priority to U.S. Provisional Patent Application Ser. No. 62/962,526, filed Jan. 17, 2020, which is incorporated herein by reference in its entirety.

TECHNICAL FIELD

This disclosure relates to systems and methods for making modifications to vehicle steering.

BACKGROUND

Vehicles, such as cars, trucks, sport utility vehicles, crossovers, mini-vans, marine craft, aircraft, all-terrain vehicles, recreational vehicles, or other suitable vehicles, may experience torque steer or traction steer during operating events where corresponding wheels of such vehicles are turned. For example, an operator of such a vehicle may turn a steering mechanism to guide the vehicle along a curved portion of a path being traversed by the vehicle. During such events, the operator may experience the torque steer or traction steer as erratic behavior in the steering mechanism.

Typically, such vehicles are provided with an unintended steering mitigation system that applies a return torque to the steering mechanism to reduce or eliminate such erratic behavior in the steering mechanism. The unintended steering mitigation system of a vehicle may include, for example, a steer-by-wire (SbW) system, whereby the vehicle is designed without a mechanical link between the hand wheel and the road wheel. In such vehicles, the SbW system may use a first actuator for tracking a position at the road wheel based on driver input and a second actuator for providing road feedback to the driver via torque tracking at the hand wheel. Typically, the SbW system may determine a return torque value based on the various characteristics of the steering mechanism and may apply torque to the steering mechanism according to the return torque value to reduce or eliminate the erratic behavior of the steering mechanism.

SUMMARY

An aspect of the disclosed embodiments includes a steering system. The steering system includes a processor and a memory. The memory includes instructions that, when executed by the processor, cause the processor to: receive rack force estimate data; receive vehicle speed data that indicates a speed of a vehicle associated with the steering system; classify the rack force estimate data into corresponding rack force estimate segments associated with frequency ranges; estimate, based on at least one rack force estimate segment and the vehicle speed data, a rack force value; and control vehicle steering based on at least the rack force value.

Another aspect of the disclosed embodiments includes a method. The method includes receiving rack force estimate data and receiving vehicle speed data that indicates a speed of a vehicle. The method also includes classifying the rack force estimate data into corresponding rack force estimate segments associated with frequency ranges and estimating, based on at least one rack force estimate segment and the vehicle speed data, a rack force value. The method also includes controlling vehicle steering based on at least the rack force value.

Another aspect of the disclosed embodiments includes an apparatus for a steering system. The apparatus includes a processor and a memory. The memory includes instructions that, when executed by the processor, cause the processor to: receive rack force estimate data associated with at least one of an observer-based model and a bicycle model; receive vehicle speed data that indicates a speed of a vehicle associated with the steering system; classify the rack force estimate data into corresponding rack force estimate segments associated with frequency ranges; apply an interpolation to at least one rack force estimate segment after filtering the at least one rack force estimate segment; estimate, based on the at least one rack force estimate segment and the vehicle speed data, a rack force value; and control vehicle steering based on at least the rack force value.

These and other aspects of the present disclosure are disclosed in the following detailed description of the embodiments, the appended claims, and the accompanying figures.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1A:
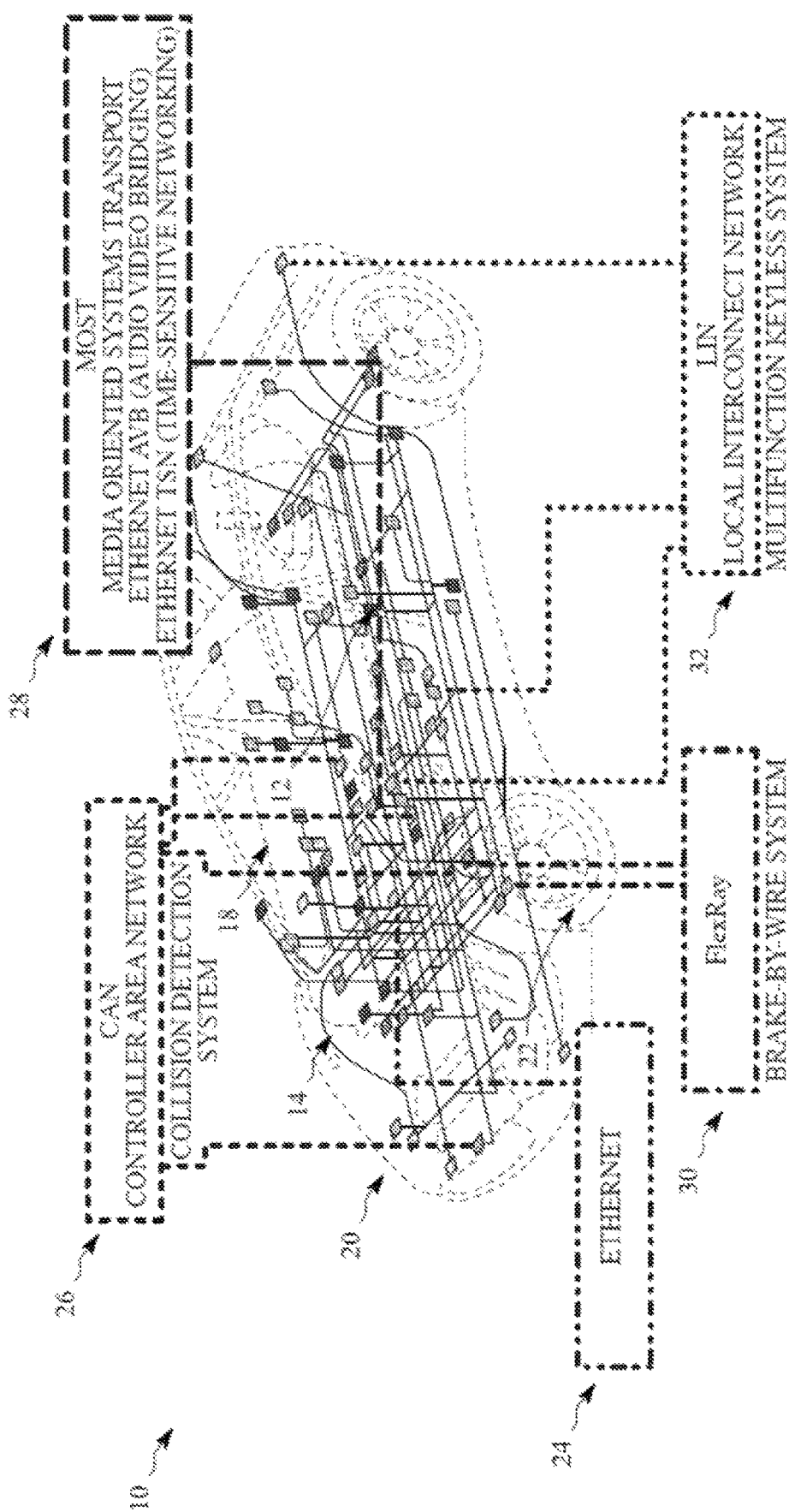
FIG. 1A generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Vehicles may experience torque steer or traction steer during operating events where corresponding wheels of the vehicles are turned. Torque steer may include automatic steering caused by unequal driveline torques. Traction steer may include automatic steering caused by unequal traction forces at two front wheels of the vehicle, even though the driveline torques may be balanced on both sides of the vehicle (e.g., driving on μ-split road).

During such events, the operator may experience the torque steer or traction steer as erratic behavior in the steering mechanism. Generally, torque steer and/or traction steer may result in steering to one side of the vehicle when accelerating in a relatively straight line or reduced return in the steering mechanism when the vehicle is cornering.

In some situations, these vehicles may use a steer-by-wire (SbW) system that applies a return torque to the steering mechanism to reduce or eliminate such erratic behavior in the steering mechanism. Such SbW systems typically analyze various characteristics of the steering mechanism during such operating events. For example, a SbW system may analyze a position of the steering mechanism, a torque applied to the steering mechanism, and a velocity of the steering mechanism in order to determine a return torque value. The SbW system may then apply torque to the steering mechanism according to the return torque value in order to reduce or eliminate the erratic behavior of the steering mechanism.

In some embodiments, the applied torque (e.g., the road feedback for the operator) may be shaped by estimating a rack force that acts on a rack of the vehicle. For example, the SbW system may estimate a rack force using a disturbance observer with a rack motor command and rack velocity as inputs. Additionally, or alternatively, the SbW system may estimate the rack force using a bicycle model. Typically, the bicycle model does not include road surface data and therefore only utilizes an observer estimate. In situations where an effort function is used to estimate the rack force, the rack force from the observer may be passed through an interpolation curve to map from N to Nm, whereby the content is then filtered and a gain is applied.

However, increasing effort gain to allow more frequency content through may cause instability at the hand wheel because of the limited stability margin of the outer loop. Selecting an effort gain within the margin often affects the frequency content related to the road surface (e.g., gravel, which may have a low amplitude and a high frequency). Additionally, differences in rack friction (and/or related factors) may cause variations in frequency content when estimating a rack force value between vehicles or vehicle components. This may cause non-uniformity of steering feel where tuning is specific to a vehicle. Furthermore, rack force effort may be lost at certain frequencies. For example, when comparing the rack force estimate to the output of the effort block, a drop in slope can be observed. This causes an uncertain steering feel.

Accordingly, systems and methods, such as those described herein, that are configured to provide intelligent modifications to vehicle steering, may be desirable. In some embodiments, the systems and methods described herein may be configured to receive rack force estimate data. In some embodiments, the rack force estimate data corresponds to an observer-based model. In some embodiments, the rack force estimate data corresponds to a bicycle model. The systems and methods described herein may be configured to receive vehicle speed data that indicates a speed of a vehicle associated with the steering system.

The systems and methods described herein may be configured to classify the rack force estimate data into corresponding rack force estimate segments associated with frequency ranges. In some embodiments, a first frequency range associated with a first rack force estimate segment includes frequencies that are less than 2 hertz. In some embodiments, a second frequency range associated with a second rack force estimate segment includes frequencies that are between 2 hertz and 8 hertz. In some embodiments, a third frequency range associated with a third rack force estimate segment includes frequencies that are between 8 hertz and 15 hertz.

The systems and methods described herein may be configured to estimate, based on at least one rack force estimate segment and the vehicle speed data, a rack force value. The systems and methods described herein may be configured to control vehicle steering based on at least the rack force value. In some embodiments, the systems and methods described herein may be configured to apply an interpolation to the at least one rack force estimate segment to estimate the rack force value. In some embodiments, the systems and methods described herein may be configured to apply the interpolation to the at least one rack force estimate segment after filtering the at least one rack force estimate segment.

FIG. 1A generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system or other suitable steering system. The steering system may be configured to receive various inputs, including, but not limited to, a handwheel position, an input torque, one or more roadwheel positions, other suitable inputs or information, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 1B:
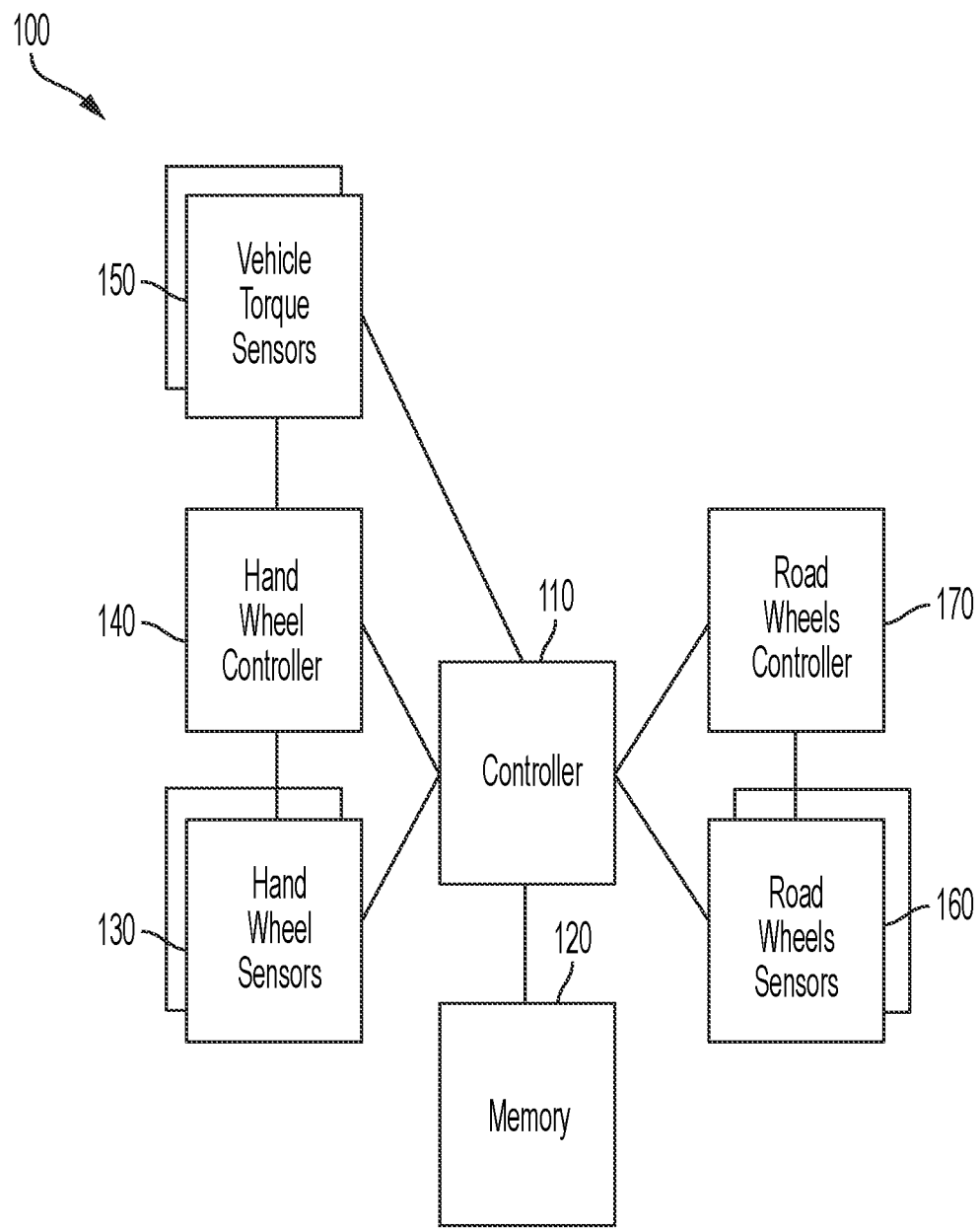
FIG. 1B generally illustrates a steering management system according to the principles of the present disclosure.

FIG. 1B generally illustrates a steering management system 100. The steering management system 100 may be configured to provide modifications to steering a vehicle, such as the vehicle 10 or other suitable vehicle, based on steering events resulting in torque steer, traction steer, and/or any other steering events. The steering management system 100 includes a controller 110. The controller 110 may include any suitable controller and may include a processor. The processor may include any suitable processor, such as those described herein. Additionally, or alternatively, the controller 110 may include two or more processors. The processor may be configured to execute instructions stored on a memory, such as the memory 120. The memory 120 may comprise a single disk or a plurality of disks (e.g., hard drives), and includes a storage management module that manages one or more partitions within the memory 120. In some embodiments, memory 120 may include flash memory, semiconductor (solid state) memory or the like. The memory 120 may include Random Access Memory (RAM), a Read-Only Memory (ROM), or a combination thereof. The memory 120 may include instructions that, when executed by the processor, cause the processor to, at least, perform various functions of the vehicle 10, including those described herein.

The instructions stored on the memory 120, when executed by the controller 110, cause the controller 110 to, at least, provide steering mitigation, as described. For example, the controller 110 may receive one or more measurements corresponding to various characteristics of a steering mechanism of the vehicle 10. The steering mechanism may include any suitable steering mechanism, such as a steering wheel or hand wheel. The steering mechanism may be referred to as a hand wheel, hereinafter. The measurements corresponding to various characteristics of the hand wheel may include a hand wheel position. For example, the steering management system 100 may include the hand wheel sensors 130. The hand wheel sensors 130 may include a hand wheel position sensor. The hand wheel position sensor may be disposed proximate to the hand wheel or remote from the hand wheel. The hand wheel position sensor may be configured to measure a positon of the hand wheel relative to a reference position. The reference position may include a center position of the hand wheel (e.g., a position of the hand wheel where the wheels 22 of the vehicle 10 are centered).

The hand wheel position sensor may measure an angle of rotation relative to the reference point or a distance between the position of the hand wheel and the reference position, during rotation of the hand wheel. For example, the operator of the vehicle 10 may guide the vehicle 10 along a curved portion of a path being traversed by the vehicle 10. When the operator turns the hand wheel in order to follow the curative of the path, the distance between the position of the hand wheel and the reference position increases. The hand wheel position sensor is configured to generate a hand wheel position signal corresponding to the hand wheel position measurement. The hand wheel position sensor communicates the hand wheel position signal to the controller 110.

In some embodiments, the hand wheel sensors 130 include a hand wheel torque sensor. The hand wheel torque sensor may be configured to measure an amount of torque applied to the hand wheel during rotation of the hand wheel. For example, when the operator rotates the hand wheel to follow the curvature of the path, the operator applies an amount of torque to the hand wheel. Additionally, or alternatively, when the vehicle 10 experiences torque steer or traction steer, an amount of torque may be applied to the hand wheel from, for example, the wheels 22 of the vehicle 10. The hand wheel torque sensor determines a hand wheel torque value corresponding to the amount of torque applied to the hand wheel. The hand wheel torque sensor generates a hand wheel torque signal corresponding to the hand wheel torque value. The hand wheel torque sensor may communicate the hand wheel torque signal to the controller 110.

In some embodiments, the hand wheel sensors 130 may include a hand wheel velocity sensor. The hand wheel velocity sensor may be configured to measure a velocity of rotation of the hand wheel. For example, when the operator rotates the hand wheel to follow the curvature of the path, the hand wheel rotates at a velocity. Additionally, or alternatively, when the vehicle 10 experiences torque steer or traction steer, an amount of torque may be applied to the hand wheel from, for example, the wheels 22 of the vehicle 10, which may increase or decrease the hand wheel velocity. The hand wheel velocity sensor determines a hand wheel velocity of the hand wheel. The hand wheel velocity sensor generates a hand wheel velocity signal corresponding to the hand wheel velocity. The hand wheel velocity sensor may communicate the hand wheel velocity signal to the controller 110 and/or to the hand wheel controller 140. The hand wheel controller 140 includes any suitable controller or processor.

In some embodiments, the vehicle 10 includes various vehicle 10 torque sensors 150. The vehicle torque sensors 150 may include a transmission torque sensor or other suitable sensor configured to measure and/or calculate the transmission torque. The transmission torque sensor may be configured to measure a transmission torque generated by the transmission of the vehicle 10. The transmission torque may correspond or be related to an engine speed of the vehicle 10 (e.g., during propulsion of the vehicle 10). The transmission torque sensor may determine a transmission torque value corresponding to the measured transmission torque. The transmission torque sensor may generate a transmission torque signal corresponding to the transmission torque. The transmission torque sensor may communicate the transmission torque signal to the controller 110 and/or to the hand wheel controller 140.

The vehicle torque sensors 150 may include a drive torque sensor. For example, the vehicle 10 may include an electric vehicle or a hybrid vehicle. The vehicle may include one or more electric motors configured to propel the vehicle 10 during operation. The one or more electric motors generate relatively high torque amounts during operation of the vehicle 10. The drive torque sensor is configured to measure drive or motor torque generated by the one or more electric motors of the vehicle 10. The drive torque sensor may be configured to determine a motor torque value corresponding to the measured motor torque. The drive torque sensor generates a motor torque signal corresponding to the motor toque value. The drive torque sensor provides the motor torque signal to the controller 110 and/or to hand wheel controller 140.

In some embodiments, the controller 110 may be configured to determine a hand wheel return value (e.g., a return command) during rotation of the hand wheel (e.g., when the operator rotates the hand wheel to, for example, follow the curvature of the path, as described). For example, the controller 110 receives a hand wheel position signal corresponding to the position of the hand wheel, from the hand wheel sensors 130. The controller 110 determines a hand wheel return value corresponding to the hand wheel position. For example, the controller 110 may access a two-dimensional look-up table stored in the memory 120 or in another suitable storage device within the vehicle 10 or remotely located from the vehicle 10. The two-dimensional look-up table may include any suitable look-up table and may indicate a return value corresponding to an amount of torque to be applied to the hand wheel in order to return the hand wheel to the center position during rotation of the hand wheel.

In some embodiments, the controller 110 receives the hand wheel torque signal corresponding to the hand wheel torque value from the hand wheel sensors 130. The controller 110 may receive the hand wheel velocity signal corresponding to the hand wheel velocity from the hand wheel sensors 130. The controller 110 may scale or adjust the hand wheel return value based on the hand wheel torque value, the hand wheel velocity, or a combination thereof.

For example, the controller 110 may access the two-dimensional look-up table or another suitable look-up table to identify a hand wheel torque scaling value corresponding to the hand wheel torque value. The hand wheel torque scaling value may indicate an amount to scale (e.g., to increase or decrease by) the hand wheel return value by to compensate for the hand wheel torque value. The controller 110 may access the two-dimensional look-up table or another suitable look-up table to identify a hand wheel velocity scaling value corresponding to the hand wheel velocity value. The hand wheel velocity scaling value may indicate an amount to scale (e.g., to increase or decrease by) the hand wheel return value by to compensate for the hand wheel velocity value. The controller 110 may scale or adjust the hand wheel return value according to the hand wheel torque scaling value, the hand wheel velocity scaling value, or a combination thereof.

In some embodiments, the controller 110 may be configured to further scale or adjust the hand wheel return value based on the transmission torque value and/or the motor torque value. For example, the controller 110 may receive the transmission torque signal corresponding to the transmission torque value from the vehicle torque sensors 150. The controller 110 may determine whether the transmission torque value is greater than a threshold. The threshold may include any suitable value and may correspond to a torque value indicative of the transmission torque contributing to erratic behavior of the hand wheel (e.g., when the vehicle 10 is operating at relatively high speeds).

If the controller 110 determines that the transmission torque value is greater than the threshold, the controller 110 may access the two-dimensional look-up table or another suitable look-up table to identify a transmission torque scaling value corresponding to the transmission toque value. The transmission torque scaling value may indicate an amount to scale (e.g., to increase or decrease by) the hand wheel return value by to compensate for the transmission torque. The controller 110 may scale or adjust the hand wheel return value according to the transmission torque scaling value. Conversely, if the controller 110 determines that the transmission torque value is less than the threshold, the controller 110 does not scale or adjust the hand wheel return value to compensate for the transmission torque value.

In some embodiments, the controller 110 may receive the motor torque signal corresponding to the motor torque value from the vehicle torque sensors 150. The controller 110 may determine whether the motor torque value is greater than a threshold. The threshold may include any suitable value and may correspond to a torque value indicative of the motor torque contributing to erratic behavior of the hand wheel (e.g., when the vehicle 10 includes one or more electric motors and/or is operating at relatively high vehicle speeds).

If the controller 110 determines that the motor torque value is greater than the threshold, the controller 110 may access the two-dimensional look-up table or another suitable look-up table to identify a motor torque scaling value corresponding to the motor toque value. The motor torque scaling value may indicate an amount to scale (e.g., to increase or decrease by) the hand wheel return value by to compensate for the motor torque. The controller 110 may scale or adjust the hand wheel return value according to the motor torque scaling value. Conversely, if the controller 110 determines that the motor torque value is less than the threshold, the controller 110 does not scale or adjust the hand wheel return value to compensate for the motor torque value.

In some embodiments, the controller 110 may receive the transmission torque signal and the motor torque signal. The controller 110 may determine whether one or both of the transmission torque value and the motor torque value are above the threshold, and may identify the transmission torque scaling value and the motor torque scaling value, accordingly. The controller 110 may scale or adjust the hand wheel return value according to the transmission torque scaling value and the motor torque scaling value.

The steering management system 100 includes road wheels sensors 160. The road wheels sensors 160 may include a location sensor, a speed sensor (e.g., capable of measuring rotations per minute (rpm) of a wheel, speed of a vehicle, and/or the like), a pressure sensor, and/or the like. The road wheels sensors 160 may, for example, be capable of tracking a position of a road wheel (e.g., relative to a known position), capable of identifying a speed associated with a road wheel, capable of identifying an rpm of a road wheel, capable of identifying a pressure level of a road wheel, and/or the like. The road wheels sensors 160 provide sensor readings to the controller 110 and/or to the road wheels controller 170. Road wheels controller 170 may include any suitable controller or processor.

Figure 2:
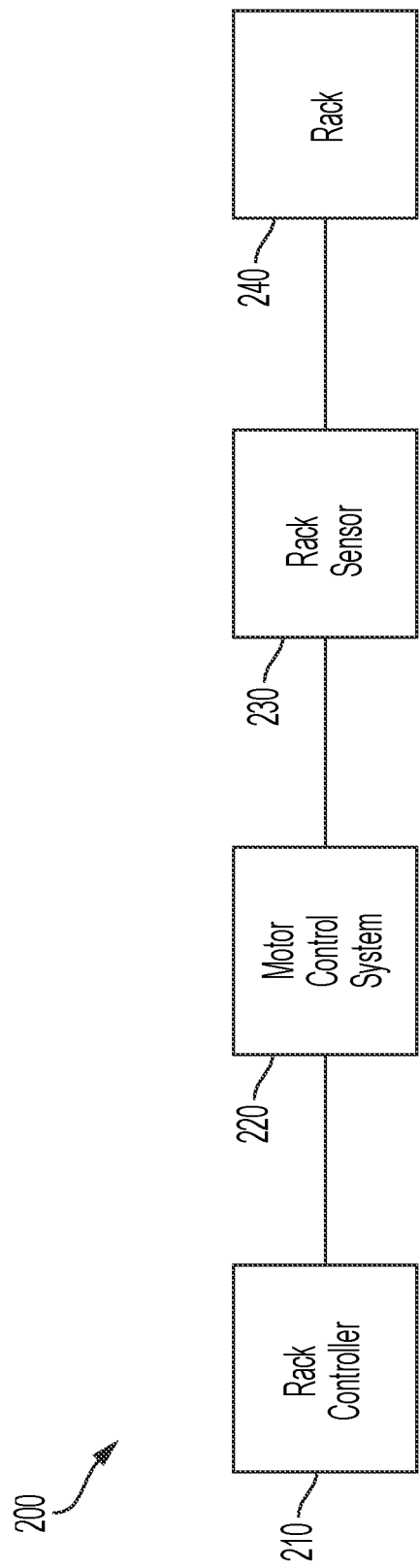
FIG. 2 generally illustrates a rack and corresponding rack components according to the principles of the present disclosure.

In some embodiments, the steering management system 100 and/or the controller 110 may perform the methods described herein. However, the methods described herein as performed by the steering management system 100 and/or the controller 110 are not meant to be limiting, and any type of software executed on a controller can perform the methods described herein without departing from the scope of this disclosure. For example, a controller, such as a processor executing software within a computing device, can perform the methods described herein, FIG. 2 generally illustrates a rack and corresponding rack components according to the principles of the present disclosure. For example, a vehicle may include a rack controller 210, a motor control system 220, a rack sensor 230, a rack 240, and/or any other components and/or elements described elsewhere herein. The rack controller 210 includes any suitable controller or processor. The motor control system includes any suitable components and/or elements. The rack sensor 230 includes any sensors capable of capturing sensor data that would be used to measure or estimate a force being applied to rack 240.

In some embodiments, rack sensor 230 may capture sensor data and may transmit the sensor data to rack controller 210 (e.g., via motor control system 220). This may allow the rack controller 210 to provide the sensor data to controller 110 (e.g., which may further process the sensor data to determine a rack force estimate).

In some embodiments, the controller 110 may perform the methods described herein. However, the methods described herein as performed by the controller 110 are not meant to be limiting, and any type of software executed on a controller or processor can perform the methods described herein without departing from the scope of this disclosure. For example, a controller, such as a processor executing software within a computing device, can perform the methods described herein.

Figure 3:
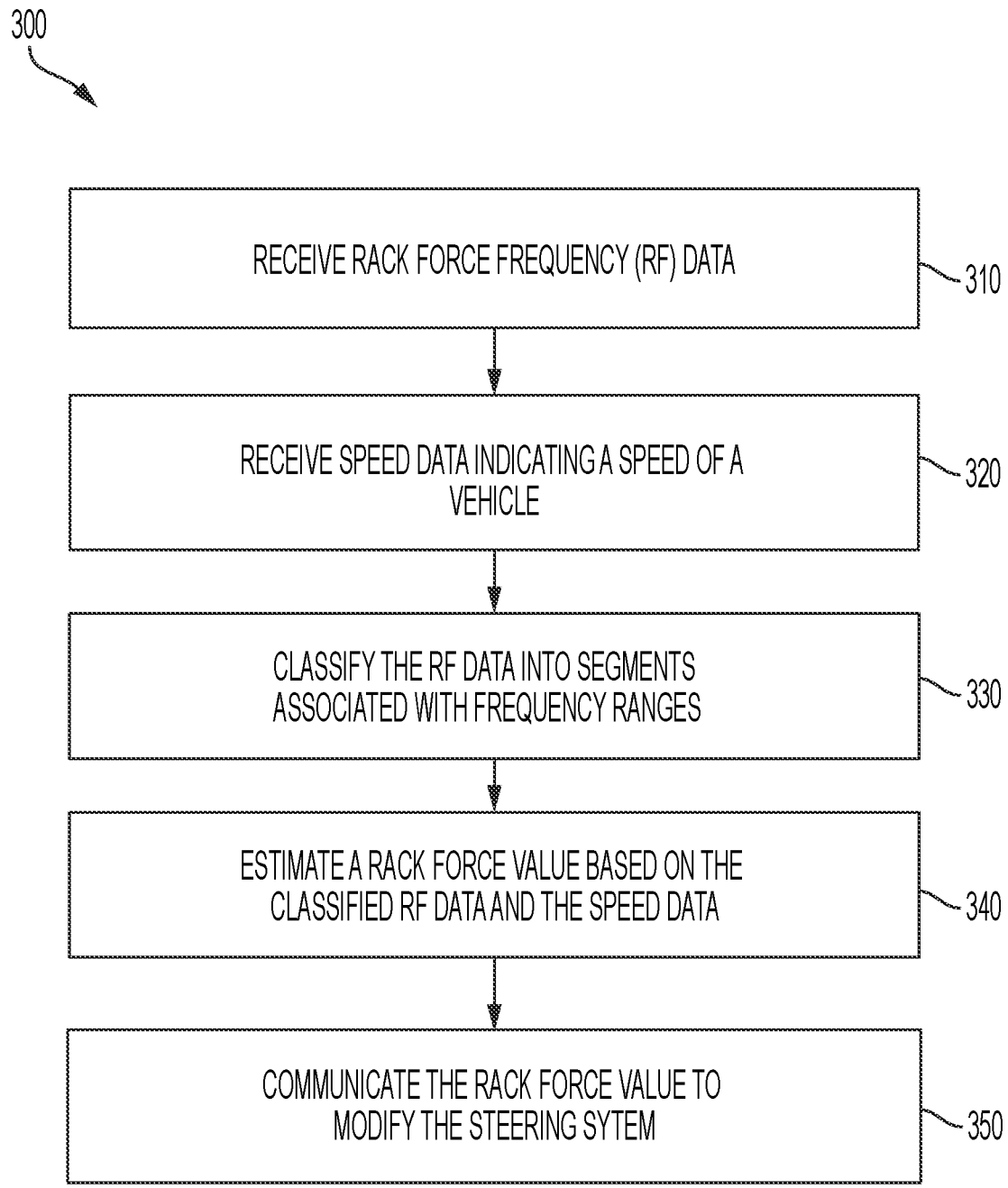
FIG. 3 is a flowchart generally illustrating a steering configuration method according to the principles of the present disclosure.

FIG. 3 is a flowchart generally illustrating a steering configuration method 300 according to the principles of the present disclosure. At 310, the method 300 receives input data. For example, controller 110 may receive the rack force frequency (RF) data from one or more vehicle sensors and/or actuators. In some embodiments, controller 110 may receive the RF data from a hand wheel sensor 130, from a vehicle torque sensor 250, from a road wheel sensors 260, from a rack sensor 330, and/or the like. In some embodiments, controller 110 may receive sensor data from one or more vehicle sensors and/or actuators and may generate RF data based on the sensor data. In some embodiments, a frequency may indicate a degree to which a particular force was measured by a sensor associated with the vehicle 10.

In some embodiments, controller 110 (e.g., using a base frequency selector module) may receive a set of RF data that has been generated using a bicycle model and may process the set of RF data to identify base RF data. For example, controller 110 may identify low frequency values that are to be selected as the base frequency.

At 320, the method 300 receives vehicle speed data that indicates a speed of the vehicle. For example, controller 110 may receive speed data from road wheels sensors 160.

At 330, the method 300 classifies the RF data into segments associated with frequency ranges. For example, controller 110 may classify the RF data into segments that represent N frequency ranges. To provide a specific example, controller 110 may classify the RF data into a first segment that represents a first frequency range that corresponds to low frequencies, a second segment that represents a second frequency range that corresponds to medium frequencies, and a third segment that represents a third frequency range that corresponds to high frequencies.

In some embodiments, controller 110 may be configured to use low frequency range values (<2 Hz) to capture the vehicle's response to operator feedback. This information can be obtained either from a bicycle model or from the observer. Using the bicycle model to provide base steering feel reduces part-to-part variation and improves uniformity across vehicles of the same class. This content is then passed through an interpolation curve.

In some embodiments, controller 110 may be configured to use medium frequency range values (2 Hz to 8 Hz) and high frequency range values (8 Hz to 15 Hz, or more) to capture road frequency data. This data is also passed through interpolation curves. This allows for limiting and managing amplitudes of feedback torque at higher frequencies for driver comfort.

Individual gains on each frequency allow more tuning flexibility without breaching the stability margins.

At 340, the method 300 estimates a rack force value based on the classified RF data and the speed data. For example, controller 110 (e.g., using an effort function, an interpolation technique, and/or the like) may process classified RF data and/or speed data to estimate a rack force value. In some embodiments, controller 110 may estimate a rack force value using an effort function. Additionally, or alternatively, controller 110 may estimate a rack force value using a bicycle model.

In some embodiments, controller 110 may perform one or more actions to identify and/or select a particular function (and/or model) based on an amplitude value. In some embodiments, controller 110 may consider road surface data when utilizing the bicycle model. In some embodiments, based on operator preference, a frequency range can be selected using independent gain selection.

In some embodiments, controller 110 may utilize interpolation after filtering. In some embodiments, such as when interpolation is applied before filtering, there may be a significant drop in amplitude and slope. Consequently, filtering before interpolating improves the response. In some embodiments, filtering before interpolation allows a vehicle engineer to tune the final effort signal rather than an intermediate one, thereby improving design transparency.

By adding road surface content to the bicycle-model-driven estimation of the rack force value, controller 110 enables a uniform steering form across vehicle components. One or more embodiments described herein allow controller 110 to increase road feedback or frequency content without causing instability. In some situations, effects of the frequency content are decoupled from the estimation of the rack force value to improve stability and steering feel. One or more embodiments described herein enable a uniform steering feel across all frequencies and can mitigate amplitude changes due to resonance. One or more embodiments described herein allow diagnostics to be used to select base frequency content from two or more rack force estimation sources, allow diagnostics to be used to select a desired frequency range, and/or the like.

At 350, the method 300 selectively controls a position of a vehicle component based on the estimated rack force value. For example, controller 110 may selectively control a position of a hand wheel, may selectively control a position of a rack, and/or the like.

Figure 4:
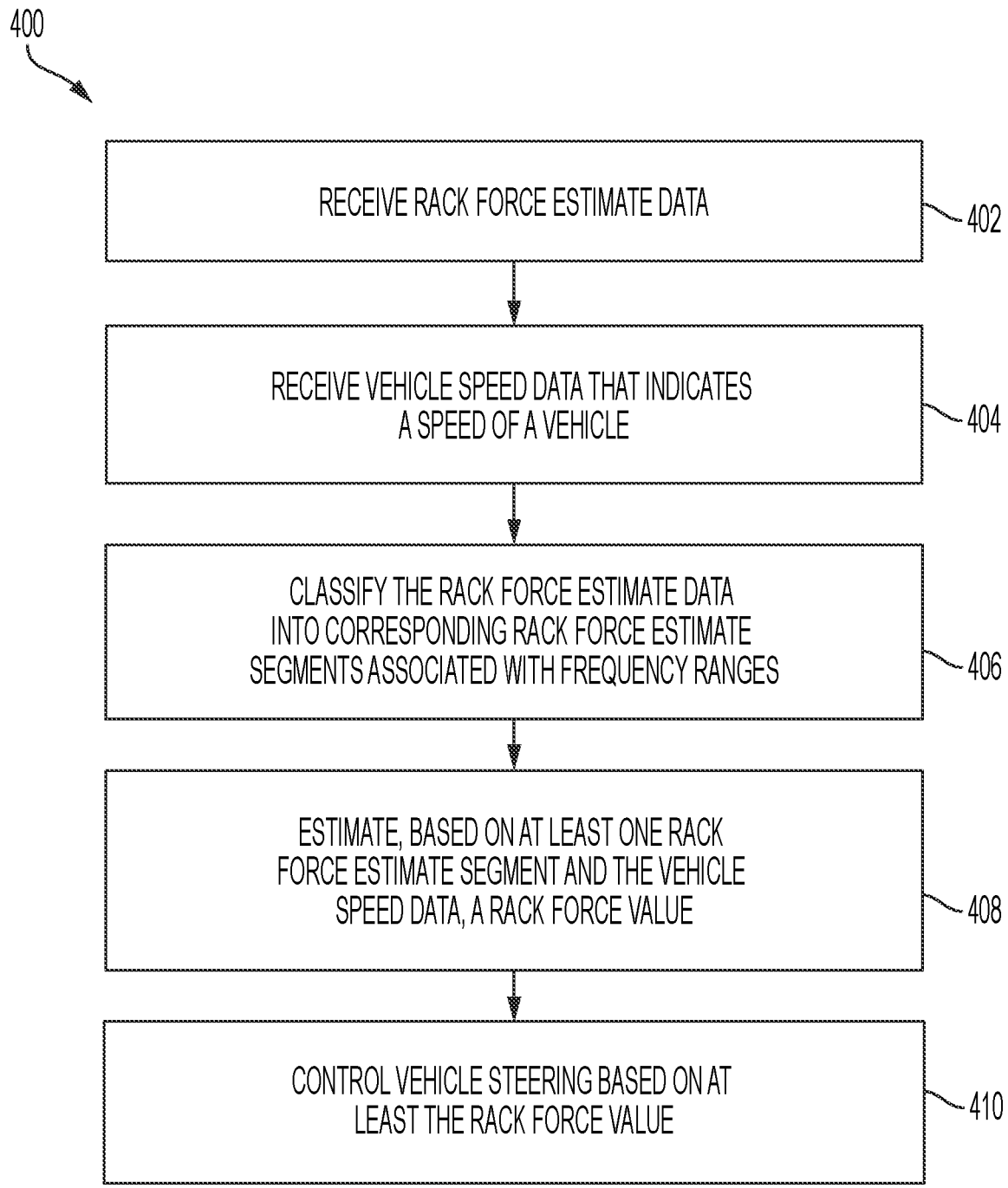
FIG. 4 is a flowchart generally illustrated an alternative steering configuration method according to the principles of the present disclosure.

FIG. 4 is a flowchart generally illustrated an alternative steering configuration method 400 according to the principles of the present disclosure. At 402, the method 400 receives rack force estimate data. For example, the controller 110 may receive rack force estimate data corresponding to one of an observer-based model and a bicycle model.

At 404, the method 400 receives vehicle speed data indicating a speed of a vehicle. For example, the controller 110 may receive vehicle speed data indicating a vehicle speed of the vehicle 10.

At 406, the method 400 classifies the rack force estimate data into corresponding rack force estimate segments associated with frequency ranges. For example, the controller 110 may classify the rack force estimate data into rack force estimate segments having associated frequency ranges.

At 408, the method 400 estimates, based on at least one rack force estimate segment and the vehicle speed data, a rack force value. For example, the controller 110 may estimate, based on at least one rack force estimate segment and the vehicle speed data, a rack force value.

At 410, the method 400 controls vehicle steering based on at least the rack force value. For example, the controller 110 may control various aspects of vehicle steering of the vehicle 10 using, at least, the rack force value.

In some embodiments, a steering system includes a processor and a memory. The memory includes instructions that, when executed by the processor, cause the processor to: receive rack force estimate data; receive vehicle speed data that indicates a speed of a vehicle associated with the steering system; classify the rack force estimate data into corresponding rack force estimate segments associated with frequency ranges; estimate, based on at least one rack force estimate segment and the vehicle speed data, a rack force value; and control vehicle steering based on at least the rack force value.

In some embodiments, a first frequency range associated with a first rack force estimate segment includes frequencies that are less than 2 hertz. In some embodiments, a second frequency range associated with a second rack force estimate segment includes frequencies that are between 2 hertz and 8 hertz. In some embodiments, a third frequency range associated with a third rack force estimate segment includes frequencies that are between 8 hertz and 15 hertz. In some embodiments, the rack force estimate data corresponds to an observer-based model. In some embodiments, the rack force estimate data corresponds to a bicycle model. In some embodiments, the instructions further cause the processor to apply an interpolation to the at least one rack force estimate segment to estimate the rack force value. In some embodiments, the instructions further cause the processor to apply the interpolation to the at least one rack force estimate segment after filtering the at least one rack force estimate segment.

In some embodiments, a method includes receiving rack force estimate data and receiving vehicle speed data that indicates a speed of a vehicle. The method also includes classifying the rack force estimate data into corresponding rack force estimate segments associated with frequency ranges and estimating, based on at least one rack force estimate segment and the vehicle speed data, a rack force value. The method also includes controlling vehicle steering based on at least the rack force value.

In some embodiments, a first frequency range associated with a first rack force estimate segment includes frequencies that are less than 2 hertz. In some embodiments, a second frequency range associated with a second rack force estimate segment includes frequencies that are between 2 hertz and 8 hertz. In some embodiments, a third frequency range associated with a third rack force estimate segment includes frequencies that are between 8 hertz and 15 hertz. In some embodiments, the rack force estimate data corresponds to an observer-based model. In some embodiments, the rack force estimate data corresponds to a bicycle model. In some embodiments, the method also includes applying an interpolation to the at least one rack force estimate segment to estimate the rack force value. In some embodiments, the method also includes applying the interpolation to the at least one rack force estimate segment after filtering the at least one rack force estimate segment.

In some embodiments, an apparatus for a steering system includes a processor and a memory. The memory includes instructions that, when executed by the processor, cause the processor to: receive rack force estimate data associated with at least one of an observer-based model and a bicycle model; receive vehicle speed data that indicates a speed of a vehicle associated with the steering system; classify the rack force estimate data into corresponding rack force estimate segments associated with frequency ranges; apply an interpolation to at least one rack force estimate segment after filtering the at least one rack force estimate segment; estimate, based on the at least one rack force estimate segment and the vehicle speed data, a rack force value; and control vehicle steering based on at least the rack force value.

In some embodiments, a frequency range associated with the at least one rack force estimate segment includes frequencies that are less than 2 hertz. In some embodiments, a frequency range associated with the at least one rack force estimate segment includes frequencies that are between 2 hertz and 8 hertz. In some embodiments, a frequency range associated with the at least one rack force estimate segment includes frequencies that are between 8 hertz and 15 hertz.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A steering system, comprising:
a processor; and
a memory including instructions that, when executed by the processor, cause the processor to:
receive rack force estimate data;
receive vehicle speed data that indicates a speed of a vehicle associated with the steering system;
classify the rack force estimate data into corresponding rack force estimate segments, wherein some of the rack force estimate segments are associated with a first frequency range, some of the rack force estimate segments are associated with a second frequency range, and some of the rack force estimate segments are associated with a third frequency range, wherein the rack force estimate segments associated with the first frequency range correspond to vehicle responses to operator feedback, and wherein the rack force estimate segments associated with the second frequency range and the rack force estimate segments associated with third frequency range correspond to road frequency data;
apply a first interpolation to at least one rack force estimate segment associated with the first frequency range;
apply a second interpolation to at least one rack force estimate segment associated with the second frequency range
apply a third interpolation to at least one rack force estimate segment associated with the third frequency range;
estimate a rack force value based on the vehicle speed data and at least one of the interpolated at least one rack force estimate segment associated with the first frequency range, the interpolated at least one rack force estimate segment associated with the second frequency range, and the interpolated at least one rack force estimate segment associated with the third frequency range; and
control vehicle steering based on at least the rack force value.

2. The steering system of claim 1, wherein the first frequency range includes frequencies that are less than 2 hertz.

3. The steering system of claim 1, wherein the second frequency range includes frequencies that are between 2 hertz and 8 hertz.

4. The steering system of claim 1, wherein the third frequency range includes frequencies that are between 8 hertz and 15 hertz.

5. The steering system of claim 1, wherein the rack force estimate data corresponds to an observer-based model.

6. The steering system of claim 1, wherein the rack force estimate data corresponds to a bicycle model.

7. A method comprising:
receiving rack force estimate data;
receiving vehicle speed data that indicates a speed of a vehicle;
classifying the rack force estimate data into corresponding rack force estimate segments, wherein some of the rack force estimate segments are associated with a first frequency range, some of the rack force estimate segments are associated with a second frequency range, and some of the rack force estimate segments are associated with a third frequency range, wherein the rack force estimate segments associated with the first frequency range correspond to vehicle responses to operator feedback, and wherein the rack force estimate segments associated with the second frequency range and the rack force estimate segments associated with third frequency range correspond to road frequency data;

applying a first interpolation to at least one rack force estimate segment associated with the first frequency range;

applying a second interpolation to at least one rack force estimate segment associated with the second frequency range;

applying a third interpolation to at least one rack force estimate segment associated with the third frequency range;

estimating a rack force value based on the vehicle speed data and at least one of the interpolated at least one rack force estimate segment associated with the first frequency range, the interpolated at least one rack force estimate segment associated with the second frequency range, and the interpolated at least one rack force estimate segment associated with the third frequency range; and controlling vehicle steering based on at least the rack force value.

8. The method of claim 7, wherein the first frequency range includes frequencies that are less than 2 hertz.

9. The method of claim 7, wherein the second frequency range includes frequencies that are between 2 hertz and 8 hertz.

10. The method of claim 7, wherein the third frequency range includes frequencies that are between 8 hertz and 15 hertz.

11. The method of claim 7, wherein the rack force estimate data corresponds to an observer-based model.

12. The method of claim 7, wherein the rack force estimate data corresponds to a bicycle model.

13. An apparatus for a steering system, the apparatus comprising:
   a processor; and
   a memory including instructions that, when executed by the processor, cause the processor to:
      receive rack force estimate data associated with at least one of an observer-based model and a bicycle model;
      receive vehicle speed data that indicates a speed of a vehicle associated with the steering system;
      classify the rack force estimate data into corresponding rack force estimate segments, wherein some of the rack force estimate segments are associated with a first frequency range, some of the rack force estimate segments are associated with a second frequency range, and some of the rack force estimate segments are associated with a third frequency range, wherein the rack force estimate segments associated with the first frequency range correspond to vehicle responses to operator feedback, and wherein the rack force estimate segments associated with the second frequency range and the rack force estimate segments associated with third frequency range correspond to road frequency data;
      apply a first interpolation to at least one rack force estimate segment associated with the first frequency range;
      apply a second interpolation to at least one rack force estimate segment associated with the second frequency range;
      apply a third interpolation to at least one rack force estimate segment associated with the third frequency range;
      estimate a rack force value based on the vehicle speed data and at least one of the interpolated at least one rack force estimate segment associated with the first frequency range, the interpolated at least one rack force estimate segment associated with the second frequency range, and the interpolated at least one rack force estimate segment associated with the third frequency range; and
      control vehicle steering based on at least the rack force value.

14. The apparatus of claim 13, wherein the first frequency range includes frequencies that are less than 2 hertz.

15. The apparatus of claim 13, wherein the second frequency range includes frequencies that are between 2 hertz and 8 hertz.

16. The apparatus of claim 13, wherein the third frequency range includes frequencies that are between 8 hertz and 15 hertz.

* * * * *